United States Patent
Colbourne et al.

(10) Patent No.: US 6,178,840 B1
(45) Date of Patent: Jan. 30, 2001

(54) GEAR FORM CONSTRUCTIONS

(75) Inventors: John Robert Colbourne, St. Albert (CA); Bernard E. Berlinger, Jr., Furlong, PA (US)

(73) Assignee: Genesis Partners, L.P., Horsham, PA (US)

(*) Notice: Under 35 U.S.C. 154(b), the term of this patent shall be extended for 0 days.

(21) Appl. No.: 09/057,169

(22) Filed: Apr. 8, 1998

Related U.S. Application Data

(60) Provisional application No. 60/043,172, filed on Apr. 10, 1997.

(51) Int. Cl.[7] ................................................. F16H 55/00
(52) U.S. Cl. ............................................. 74/462; 74/421 R
(58) Field of Search ............................... 74/462, 421 R, 74/412 R, 413, 414, DIG. 12

(56) References Cited

U.S. PATENT DOCUMENTS

| | | |
|---|---|---|
| 466,923 | 1/1892 | Price . |
| 1,313,035 | 8/1919 | Williams . |
| 1,425,144 | 8/1922 | Schmick . |
| 1,613,702 | 1/1927 | Hammar . |
| 1,772,986 | 8/1930 | Dunham . |
| 1,973,185 | 9/1934 | Trbojevich . |
| 2,031,888 | 2/1936 | Hill . |
| 2,071,317 | 2/1937 | Barkley . |
| 2,091,317 | 8/1937 | Hill . |
| 2,207,290 | 7/1940 | Hale . |
| 2,230,418 | 2/1941 | Wildhaber . |
| 2,308,558 | 1/1943 | Wildhaber . |
| 2,436,231 | 2/1948 | Schellens . |
| 2,686,155 | 8/1954 | Willis et al. . |
| 2,951,053 | 8/1960 | Reuter et al. . |
| 2,955,481 | 10/1960 | Jackel . |
| 2,990,724 | 7/1961 | Anderson et al. . |
| 3,180,172 | 4/1965 | Leggatt . |
| 3,232,134 | 2/1966 | Kluwe et al. . |
| 3,251,236 | 5/1966 | Wildhaber . |
| 3,371,552 * | 3/1968 | Soper . |
| 3,533,300 | 10/1970 | Studer . |
| 3,631,736 | 1/1972 | Saari . |
| 3,709,055 | 1/1973 | Grove . |
| 3,855,874 | 12/1974 | Honma et al. . |
| 3,982,445 | 9/1976 | Rouverol . |

(List continued on next page.)

FOREIGN PATENT DOCUMENTS 2 074 302  10/1971  (FR) .

OTHER PUBLICATIONS

Product Engineering; "Design of Novikov Gears"; Sep. 17, 1962*

Gear Handbook–The Design , Manufacture, And Application of Gears, By Darle W. Dudley, ©1962, pp. 1–5 to 1–7.*

International Search Report, International Application No. PCT/US98/07300 dated Jul. 20, 1998.

"Gear Nomenclature (Geometry) Terms, Definitions, Symbols and Abbreviations", AGMA Standard, Jun. 1976, pp. 1–20.

Buckingham, "Analytical Mechanics of Gears", McGraw–Hill, New York, 1949, republished by Dover, New York, 1963.

*Primary Examiner*—David Fenstermacher
(74) *Attorney, Agent, or Firm*—Akin, Gump, Strauss, Hauer & Feld L.L.P.

(57) ABSTRACT

A gearing system which includes a pair of conjugate gears. The tooth profile of the first gear lies entirely within the pitch circle of the first gear, and the tooth profile of the mating gear lies entirely outside the pitch circle of the mating gear. The profile of the first gear is fully or partially concave, and the tooth profile of the mating gear is fully or partially convex. The profiles of the conjugate gear pair may have constant, or nearly constant, relative curvature. Alternatively, due to the shape of the profiles, constant, or nearly constant, contact stress results when the gears are in mesh.

28 Claims, 3 Drawing Sheets

U.S. PATENT DOCUMENTS

| | | |
|---|---|---|
| 4,031,770 | 6/1977 | Ishikawa . |
| 4,051,745 | 10/1977 | Ishikawa . |
| 4,121,481 | 10/1978 | Riegler et al. . |
| 5,271,289 | 12/1993 | Baxter, Jr. . |
| 5,546,824 * | 8/1996 | Miller et al. ...................... 74/421 R |

* cited by examiner

GEAR FORM CONSTRUCTIONS

This application claims benefit to Provisional Application No. 60/043172 filed Apr. 10, 1997.

FIELD OF THE INVENTION

The present invention relates to the construction of profiles of conjugate gears. In particular, the present invention may be applied directly to spur gears and other gear forms.

BACKGROUND OF THE INVENTION

Several attempts have been made to reduce the contact stress in gear teeth, because a high contact stress can cause pitting and eventually failure of the teeth. Many of these attempts have been based on the Wildhaber or Novikov types of gearing, in addition to the more common involute forms. In Novikov gears, the profiles in the transverse sections are circular arcs, the pinion being convex and the gear being concave. The problem with circular arc profiles is that they are not conjugate. With conjugate profiles, the angular velocity ratio is exactly constant. In each transverse section, there is continuous contact throughout the meshing cycle and the contact point moves along each profile towards the tip of the driving tooth and towards the root of the driven tooth.

Because a variable angular velocity ratio is not acceptable, Novikov gears are made helical. This means that in each transverse section, only one pair of points come into contact. At any instant, there will be one transverse section where contact occurs and this contact point moves axially along the tooth face as the gears rotate. Such gears are generally noisy and have not been widely used. The same comments apply to Wildhaber gears which are shaped as circular arcs in the normal sections.

More recently, other profiles have been proposed in which there are two or more contact points in each transverse section. Gears having such profiles still suffer, though, from the disadvantages just described.

SUMMARY OF THE INVENTION

A gearing system, constructed in accordance with the present invention, includes a first gear having a first plurality of teeth each having a first tooth profile lying entirely within the pitch circle of the first gear and a mating gear having a second plurality of teeth each having a second tooth profile lying entirely outside the pitch circle of the mating gear. The second tooth profile of the second plurality of teeth of the mating gear is conjugate to the first tooth profile of the first plurality of teeth of the first gear. Either the relative curvature of the first tooth profile of the first gear and the second tooth profile of the mating gear is a constant, or the following function of the radius of curvature $\rho_1$ of the first tooth profile of the first gear, the radius of curvature $\rho_2$ of the second tooth profile of the mating gear, and the gear pair pressure angle $\phi$ of the first gear and the mating gear is a constant, as follows:

$$\frac{1}{\cos\phi}\left(\frac{1}{\rho_1}+\frac{1}{\rho_2}\right)=C$$

DETAILED DESCRIPTION OF THE INVENTION

Figure 4:
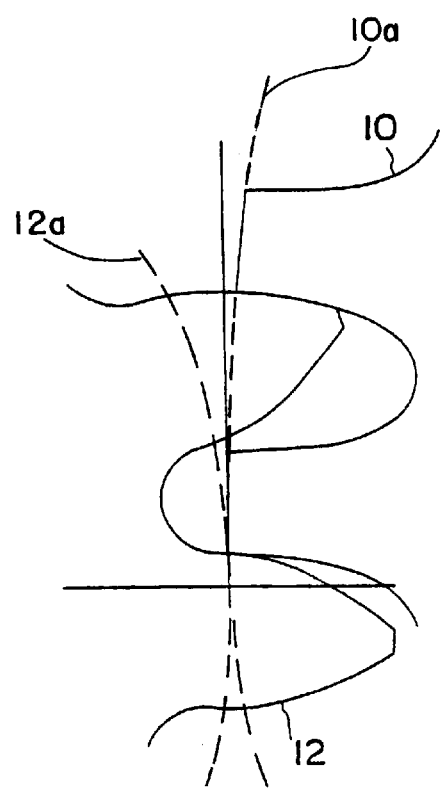
FIG. 4 shows the tooth profiles of a pinion and gear pair constructed in accordance with the present invention.

Referring to the drawings, and particularly FIG. 4, a gearing system, constructed in accordance with the present invention, includes a first gear 10 having a first plurality of teeth and a mating gear 12 having a second plurality of teeth. Each tooth of first gear 10 has a first tooth profile lying entirely within the pitch circle 10a of the first gear and each tooth of mating gear 12 has a second tooth profile lying entirely outside the pitch circle 12a of the mating gear.

As shown in FIG. 4, the first tooth profile of the teeth of first gear 10 can be partially or fully concave, while the second tooth profile of mating gear 12 can be partially or fully convex.

The second profile of the teeth of mating gear 12 is conjugate to the first tooth profile of the teeth of first gear 10. This means that when the gears are in mesh, the angular velocity ratio is constant. The gearing system is constructed such that the relative curvature of the first tooth profile of the first gear and the second tooth profile of the mating gear is constant or nearly constant. The expression for relative curvature is given by the following mathematical function of the radius of curvature $\rho_1$ of the first tooth profile and the radius of curvature $\rho_2$ of the second tooth profile:

$$\frac{1}{\rho_1}+\frac{1}{\rho_2}\cdot C1, \qquad \text{Equation 1}$$

An alternative to constructing the gearing system of the present invention such that Equation 1 is constant is to construct the first tooth profile of the first gear 10 and the second tooth profile of the mating gear 12 such that the following mathematical function of the radius of curvature $\rho_1$ of the first tooth profile, the radius of curvature $\rho_2$ of the second tooth profile, and the gear pair pressure angle $\phi$ of the first gear 10 and the mating gear 12

$$\frac{1}{\cos\phi}\left(\frac{1}{\rho_1}+\frac{1}{\rho_2}\right), C, \qquad \text{Equation 1a}$$

is constant or nearly constant. As explained below, the gearing system of the present invention is constructed such that Equation 1a is constant, or nearly constant, which results in the contact stress between meshing teeth of the gears being constant, or nearly constant, respectively.

A pair of conjugate gear tooth profiles can be specified by the gear tooth profiles of the drive gear or the driven gear, the basic rack profile or the shape of the contact path. When any one of these shapes is known, the shapes of the others can be calculated. The manner in which these shapes can be determined has been described by Buckingham, *Analytical Mechanics of Gears,* McGraw-Hill, New York, 1949, republished by Dover, New York, 1963 and is incorporated in its entirety herein. The most common way for defining a pair of profiles is to choose the shape of the basic rack. For example, if the basic rack profile is straight, involute gears are obtained. Less common, the shape of one tooth profile is chosen. For example, in Gerotor internal gear pumps, the lobes of the outer rotor are circular. Less common still, the shape of the contact path is chosen. For example, cycloidal gears can be defined as having profiles for which the contact path consists of two circular arcs.

There are two important properties of conjugate profiles which are described by Buckingham. First, conjugate gears must satisfy the Law of Gearing which requires that the common normal at the contact point (also known as the line of action) always passes through the pitch point. Second, the radii of curvature of the profiles must satisfy the Euler-Savary equation:

$$\frac{1}{\rho_1 - S} + \frac{1}{\rho_2 + S} = \frac{1}{\sin\phi}\left(\frac{1}{R_{p1}} + \frac{1}{R_{p2}}\right). \quad \text{Equation 2}$$

where $R_{p1}$ and $R_{p2}$ are the pitch circle radii; $\phi$ is the gear pair pressure angle, namely the angle between the line of action and the line through the pitch point perpendicular to the line of centers; S is the distance from the pitch point to the contact point, positive when the contact point lies on one side of the line of centers, and negative on the other; and $\rho_1$ and $\rho_2$ are the radii of curvature, positive for convex profiles and negative for concave profiles. The reciprocals of the radii of curvature, $1/\rho_1$ and $1/\rho_2$, are known as the curvatures.

According to the present invention, instead of choosing one of the shapes identified above, a relation between the radii of curvature is specified. In particular, it is possible to specify that the Equation 1 of the radii of curvature, which is the expression for relative curvature, remains constant or nearly constant.

The tooth profiles of the teeth of first gear 10 and mating gear 12 can now be constructed in the following manner. A point is chosen on either the first tooth profile of the teeth of first gear 10 or the second tooth profile of the teeth of mating gear 12. In other words, a radius and the corresponding profile angle are specified, namely the angle between the radius and the profile tangent. The corresponding point on the contact path is then calculated, so that the values $\phi$ and S in Equation 2 are known. Equations 1 and 2 are solved for the radii of curvature $\rho_1$ and $\rho_2$, and a small increment of the tooth profile of the mating gear 12, a circular arc of radius $\rho_2$, is constructed. Hence, a new point on the second tooth profile of the teeth of mating gear 12 is obtained and it is possible to calculate the corresponding points on first gear 10 and the contact path. The process is repeated as often as desired to construct the entire profiles of the teeth of both gears.

The contact stress between meshing gear teeth is given by the following expression:

$$\sigma_C = C_p\sqrt{\frac{W_t}{F\cos\phi}\left(\frac{1}{\rho_1} + \frac{1}{\rho_2}\right)}, \quad \text{Equation 3}$$

where $C_p$ is an elastic constant depending on the gear materials, $W_t$ is the transmitted force tangential to the pitch circles, and F is the face-width. For non-involute gears the gear pair pressure angle $\phi$ varies along the contact path, so if the relative curvature is chosen to remain constant, as in Equation 2, then the contact stress will vary slightly during the meshing cycle. The preferred option, then, is to choose the radii of curvature such that the Equation 1a is constant or nearly constant. Function (1a) now replaces the Equation 1 in the procedure for constructing the profiles and the gear tooth profiles are obtained for which the contact stress remains constant or nearly constant, respectively. With first gear 10 and mating gear 12 arranged as just described, the contact stress between meshing of the first plurality of teeth of first gear 10 with the second plurality of teeth of mating gear is a constant or substantially a constant, respectively. Furthermore, it may be possible to develop a variety of similar gear tooth profiles by combining the Euler-Savary equation with other mathematical functions set to a constant or nearly constant, parameterized, as are Equations 1 and 1a, by the radius of curvature of the first tooth profile of the teeth of first gear 10 and the radius of curvature of the second tooth profile of the teeth of mating gear 12.

In the majority of gear tooth designs, the profile extends from a point inside the pitch circle to a point outside. It was pointed out by Buckingham that the relative curvature of conjugate profiles at the pitch point depends only on the gear pair pressure angle $\phi$, and is independent of the shapes of the remaining parts of the profiles. This can be seen by setting S equal to zero in Equation 1, whereby the following expression is obtained for the relative curvature at the pitch point, $$\left(\frac{1}{\rho_1} + \frac{1}{\rho_2}\right)_{pitch\ point} = \frac{1}{\sin\phi}\left(\frac{1}{R_{p1}} + \frac{1}{R_{p2}}\right). \quad \text{Equation 4}$$

Combining Equations 3 and 4, yields an expression for the contact stress at the pitch point, $$\sigma_{C\ pitch\ point} = C_p\sqrt{\frac{W_t}{F\cos\phi\ \sin\phi}\left(\frac{1}{R_{p1}} + \frac{1}{R_{p2}}\right)}. \quad \text{Equation 5}$$

A common value for $\phi$ in involute gearing is 20°. Consider the case where $\phi$ is set equal to 20°, the corresponding values of the relative curvature and the contact stress are given by Equations 4 and 5. These are used herein as reference values, and as a basis for comparison of proposed designs. From Equation 5, it is clear that the only way to reduce the contact stress at the pitch point is to increase the value of $\phi$. Gear pair pressure angles above about 25° become impractical, due to the large bearing forces, and the reduction in the contact ratio. By designing profiles with a gear pair pressure angle of 25° at the pitch point, it may be possible to reduce the contact stress at the pitch point to 91.6% of the reference level. This conclusion applies to all types of conjugate profile, both involute and non-involute.

Gears designed and constructed in accordance with the present invention reduce the contact stress significantly below this value. It follows, therefore, that the proposed profiles should lie entirely inside or entirely outside the pitch circles. As a first option, the pinion tooth profile (second tooth profile) may be designed to lie outside its pitch circle, while the gear tooth profile (first tooth profile) lies within its pitch circle. With the pinion driving, all-recess action is obtained, which is generally advantageous. It should be noted, however, that the profile construction method described earlier can also be used for pinion tooth profiles (second tooth profiles) lying within the pitch circle, and the corresponding gear tooth profiles (first tooth profiles) lying outside.

In order to start the profile construction procedure, it is necessary to choose an initial point. The initial point may be chosen as a point on the pinion tooth at a diameter slightly larger than the pitch diameter. This diameter is referred to herein as the form diameter. The tooth thickness at this diameter should be chosen so that the bending strength of the pinion is approximately equal to that of the gear, and this requirement can be met if the tooth thickness is approximately 0.6 times the corresponding circular pitch. First, a value for the pinion tooth profile angle is chosen, and then the corresponding value for the gear tooth profile angle is calculated. If this value is negative, the pinion tooth profile angle should be increased, until the gear tooth profile angle is at least zero. The tooth profiles can then be constructed, and the tip of the pinion tooth profile is reached when its tooth thickness is reduced to some specified value. A suitable value for the top land is 0.3 modules, where the module is a length defined in terms of the center distance C and the tooth numbers $N_1$ and $N_2$, as $2C/(N_1+N_2)$.

Once the pinion tooth profile is constructed, the pinion rotational positions at the start and end of contact can be calculated, and hence the contact ratio. When the initial pinion tooth point is chosen in the manner just described, the contact ratio is not always adequate. A more reliable method for choosing the initial point, which is the preferred option, is to choose the initial point of the contact path.

Figure 1:
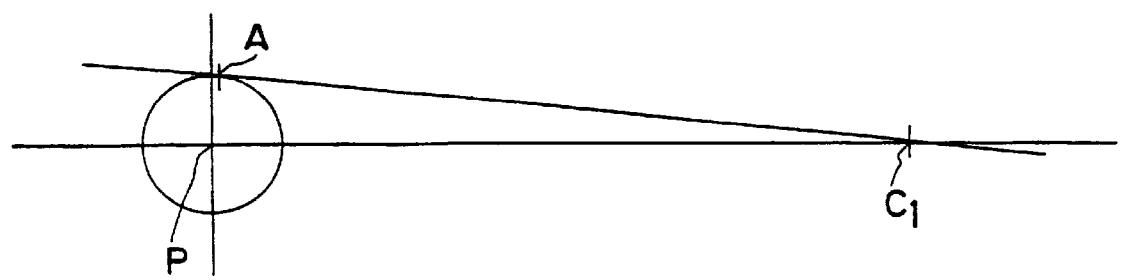
FIG. 1 is a diagram useful in understanding the manner in which a gear tooth profile is developed in accordance with the present invention.

A typical value for the distance from the pitch point to the initial point of the contact path lies in the range 0.4 to 0.8 modules. The initial point of the contact path should then lie on a circle centered at the pitch point P, as shown in FIG. 1. The tangent from the gear center $C_1$ to this circle, touching the circle at point A, is drawn. If the initial point of the contact path were to coincide with point A, a zero profile angle would result on the gear tooth at its tip, since the line of action PA would be perpendicular to the radius $C_1A$. To obtain any specified positive profile angle at the gear tooth tip, the initial point of the contact path is chosen to the right of point A, and the exact position can be found by simple trigonometry.

When the initial point of the contact path is chosen in this manner, it is found that the contact ratio is fairly insensitive to the distance chosen between the pitch point and the initial point. In cases where it is essential to maximize the contact ratio, however, the optimum distance can be found by trial and error.

When the coordinates of a number of points on the contact path have been found, the shape of the basic cutter can be found by conventional methods. A family of gears is composed of gears conjugate to a basic cutter. The basic rack is the complement of the basic cutter, and the tooth profile of the basic rack is therefore the same as that of a gear belonging to the family with an infinite number of teeth.

Figure 2:
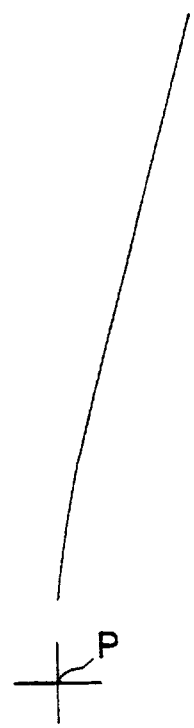
FIG. 2 shows a contact path for a gear pair constructed in accordance with the present invention.
Figure 3:
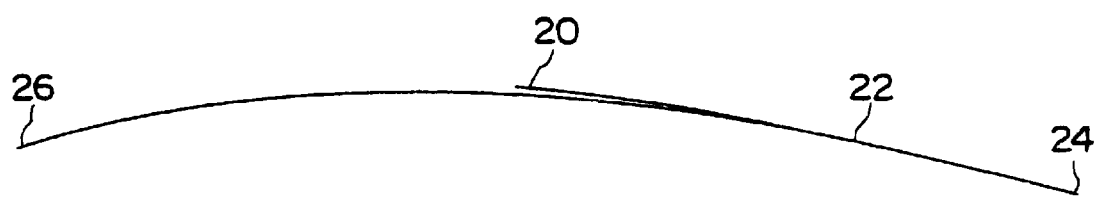
FIG. 3 shows conjugate profiles of a gearing system constructed in accordance with the present invention.

FIG. 2 shows the contact path for a gear pair in which the pinion has 15 teeth and the gear has 90 teeth. The gear pair pressure angle varies from 0.65° at the start of contact to 11.30° at the end. The conjugate profiles, also known as the active profiles, are shown in FIG. 3. The complete tooth profiles of the pinion and the gear are shown in FIG. 4. The pinion tooth profile 12 is convex, with a shape which is similar to an involute, and a radius of curvature which is small at the form diameter 26, and increases steadily towards the tip 24. The gear tooth profile 10 is much shorter than that of the pinion tooth, generally about one third the length. It is concave at the tip 20, and the radius of curvature increases towards the form diameter 22. There is, in fact, a short section of the profile adjacent to the form diameter which is convex, but the curvature is small and cannot be seen in the drawing. The concave-convex nature of the meshing surfaces will improve the wedging action of a lubricant as compared with the convex-convex surfaces of an involute gear pair. This will increase the film thickness of the lubricant, and help to protect the surfaces from wear and damage.

To complete the profile designs, it is advantageous to ensure that there is no interference, and that there is adequate clearance at the roots. The path followed by the pinion tooth tip 24 extends well inside the form circle of the gear, so there is a danger of interference at the gear tooth fillets. To avoid this danger, an intermediate section of the profile is designed, between the active face and the fillet. The epitrochoidal path of the pinion tooth tip 24 is calculated, relative to the gear. Then, for the intermediate profile of the gear tooth, a curve is constructed which coincides with the epitrochoid at the form diameter 22, and slowly diverges from it, so that the path of the pinion tooth tip is guaranteed to lie inside the tooth space of the gear. For the gear tooth fillet, a curve which is conjugate to a circular arc on the basic cutter is used, so that the tip of the hob thread would be circular. In a few cases, it has been found that the fillet designed in this manner gives inadequate clearance at the gear tooth roots. In such cases, the circular section in the basic cutter may be replaced by an oval curve, of the form $y=ax^b$. The path followed by the gear tooth tip passes only a very short distance, if at all, inside the pinion form circle, so there is no danger of interference. Hence, there is no need for an intermediate section of the pinion tooth profile. The pinion tooth fillet is designed as a curve which is conjugate to a circular arc on the basic cutter, and in this case there is always adequate clearance at the pinion tooth roots.

The profiles shown in FIGS. 3 and 4 were designed to give a constant contact stress equal to 70% of the reference value. From the manner in which the reference value was defined, it follows that an involute gear pair with a gear pair pressure angle of 20° would have a contact stress at the pitch point equal to the reference value. In an involute gear pair, however, the maximum contact stress occurs at the lowest point of single tooth contact of the pinion. An involute gear pair with 15 and 90 teeth, with a gear pair pressure angle of 20°, and the pinion tooth thickness large enough to avoid undercutting, would have a maximum contact stress 8.75% higher than the reference value. Hence, the contact stress in the proposed gear pair will be 64.4% of the maximum contact stress in the corresponding involute gear pair.

As stated earlier, the same method of profile construction may be used to design a pinion tooth profile which is all dedendum, and a gear tooth profile which is all addendum. This would be useful, for example, in a speed increasing drive. For example, a 50-tooth gear meshed with a 36-tooth pinion, may be designed so that the profiles exhibit constant contact stress equal to 75% of the reference value.

When profiles are designed for constant relative curvature, there does not appear to be any theoretical minimum value for the relative curvature, other than zero, below which the profile construction method will fail. As the relative curvature is reduced, however, the contact ratio is also reduced, so that the practical lower limit for the relative curvature is reached when the contact ratio falls to some specified value. The limiting relative curvature depends primarily on the number of teeth in both the pinion and the gear. Table 1, below, shows the influence of the tooth numbers on the lowest achievable relative curvature, as a percentage of the reference value, if the contact ratio is to be 1.2 or greater.

TABLE 1

Lowest Achievable Relative Curvature, as a Percentage of the Reference Value, Giving a Contact Ratio of at least 1.2.

| | $N_2$ | | | |
|---|---|---|---|---|
| | 40 | 60 | 80 | 100 |
| $N_1$ | | | | |
| 15 | 83 | 60 | 53 | 49 |
| 20 | 61 | 50 | 45 | 43 |
| 30 | 51 | 44 | 41 | 30 |
| 40 | 48 | 42 | 40 | 38 |

Similar considerations apply when the profiles are designed for constant contact stress. Table 2, below, shows the lowest achievable contact stress values, as a percentage of the reference value, if the contact ratio is to be 1.2 or greater.

TABLE 2

Lowest Achievable Contact Stress, as a Percentage of the Reference Value, Giving a Contact Ratio of at least 1.2

| | $N_2$ | | | |
|---|---|---|---|---|
| | 40 | 60 | 80 | 100 |
| $N_1$ | | | | |
| 15 | 89 | 76 | 71 | 69 |
| 20 | 76 | 69 | 66 | 64 |
| 30 | 70 | 66 | 63 | 62 |
| 40 | 69 | 64 | 62 | 61 |

The design procedure for an internal gear pair is essentially the same as the procedure just described for an external gear pair. For gears whose tooth profiles pass through the pitch circles, the contact stress at the pitch point again depends only on the gear pair pressure angle, and is given by $$\sigma_{C\ pitch\ point} = C_p \sqrt{\frac{W_t}{F\cos\phi\ \sin\phi}\left(\frac{1}{R_{p1}} - \frac{1}{R_{p2}}\right)}. \quad \text{Equation 6}$$

Comparison with Equation 5 shows that the stress is lower than in an external gear pair with the same size pitch circles, and this is because the internal gear tooth profile is generally concave. As before, the reference contact stress is defined as that given by Equation 6 when $\phi$ is equal to 20°. For example, an internal gear pair with 18 and 84 teeth, may be designed so that the contact stress is 60% of the reference value.

In a planetary gearset, the planet meshes simultaneously with the sun gear and the internal gear. Hence, for a planetary gearset, the sun and the planet are first designed, by the method described above. The internal gear may then be designed as the gear which is conjugate to the planet. A constant contact stress no longer exists between the planet and the internal gear, but the results are nevertheless satisfactory. For example, consider a planetary gearset, in which the sun has 48 teeth, the planet has 18 teeth, and the internal gear has 84 teeth. The sun and the planet may be designed to have a constant contact stress, equal to 70% of the reference value. The curvature of the internal gear tooth profile is found from that of the planet, using the Euler-Savary equation for an internal gear pair, and the contact stress varies from 61.1% of the reference value near the form diameter of the planet, to 47.6% of the reference value at the planet tooth tip.

It should be noted that gears constructed in accordance with the present invention may be cut by conventional methods. The external gears can be hobbed, generating ground or form-ground, and the internal gears can be shaped, using a pinion cutter. A basic rack designed according to this disclosure can be used as the profile of a crown gear, which defines the tooth profiles of a pair of bevel gears.

It is important to note that typically there is a thin lubricating film between meshing teeth. Therefore, distinctions between "contact" and "no contact" in describing the present invention have been made based on the transmission or lack of transmission of forces through such a thin lubricating film.

Figure 5A:
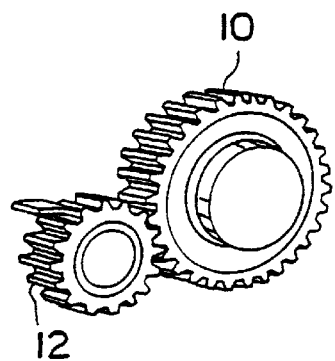
FIGS. 5A through 5D show a variety of types of gearing systems in which the present invention may be incorporated.
Figure 5B:
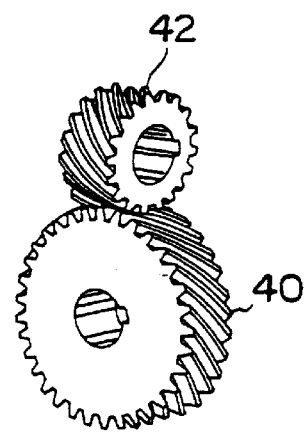
Figure 5C:
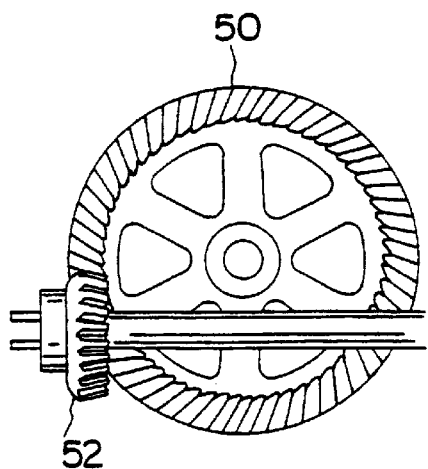
Figure 5D:
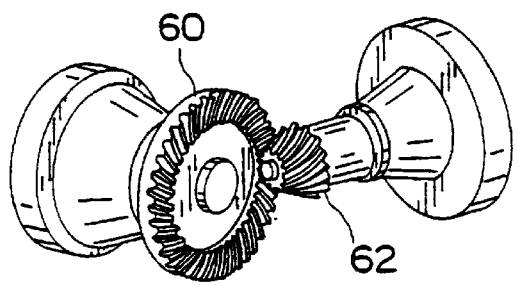

The present invention can be incorporated in various different gearing systems. In the spur gearing system shown in FIG. 5A, the axis of rotation of first gear 10 is parallel to the axis of rotation of mating gear 12. In the crossed helical gearing system of FIG. 5B, the axis of rotation of first gear 40 is perpendicular to the axis of rotation of mating gear 42. In the hypoid gearing system of FIG. 5C, the axis of rotation of first gear 50 does not intersect the axis of rotation of mating gear 52. In the spiral bevel gearing system of FIG. 5D, the axis of rotation of first gear 60 is at an angle to the axis of rotation of mating gear 62.

While in the foregoing there have been described preferred embodiments of the present invention, it should be understood by those skilled in the art that various modifications and changes can be made without departing from the true spirit and scope of the present invention.

What is claimed:

1. A gearing system comprising:
a first gear having a plurality of teeth each having a first tooth profile lying entirely within the pitch circle of said first gear; and
a mating gear having a second plurality of teeth each having a second tooth profile, conjugate to said first tooth profile through all transverse sections of the first and second profiles, and lying entirely outside the pitch circle of said mating gear, said first and second tooth profiles having a common normal at a contact point which always passes through a pitch point of said first and second tooth profiles, said first and second tooth profiles further satisfying the equation:

$$\frac{1}{\rho_1 - S} + \frac{1}{\rho_2 + S} = \frac{1}{\sin\phi}\left(\frac{1}{R_{p1}} + \frac{1}{R_{p2}}\right)$$

wherein $R_{p1}$ and $R_{p2}$ are pitch circle radii, $\phi$ is the gear pair pressure angle, S is the distance from the pitch point to the contact point, wherein S is positive when the contact point lies on one side of a line of centers, and is a negative when the contact point lies on another side of the line of centers, and wherein $\rho_1$ and $\rho_2$ represent radii of curvature, wherein the radii of curvature are positive for convex profiles and negative for concave profiles,
wherein a relative curvature of said first tooth profile of said first gear and said second tooth profile of said mating gear is a constant.

2. The gearing system of claim 1, wherein said first tooth profile is concave and said second tooth profile is convex.

3. The gearing system of claim 1, wherein a portion of said first tooth profile is concave and said second tooth profile is convex.

4. The gearing system of claim 1, wherein a portion of said first tooth profile is concave and a portion of said second tooth profile is convex.

5. The gearing system of claim 1, wherein the axis of rotation of the first gear is parallel to the axis of rotation of the mating gear.

6. The gearing system of claim 1, wherein the axis of rotation of the first gear is at an angle to the axis of rotation of the mating gear.

7. The gearing system of claim 1, wherein the axis of rotation of the first gear does not intersect the axis of rotation of the mating gear.

8. A gearing system comprising:
a first gear having a first plurality of teeth each having a first tooth profile lying entirely within the pitch circle of said first gear; and
a mating gear having a second plurality of teeth each having a second tooth profile, conjugate to said first tooth profile through all transverse sections of the first and second profiles, and lying entirely outside the pitch circle of said mating gear, said first and second tooth profiles having a common normal at a contact point which always passes through a pitch point of said first and second tooth profiles, said first and second tooth profiles further satisfying the equation:

$$\frac{1}{\rho_1 - S} + \frac{1}{\rho_2 + S} = \frac{1}{\sin\phi}\left(\frac{1}{R_{p1}} + \frac{1}{R_{p2}}\right)$$

wherein $R_{\rho 1}$ and $R_{\rho 2}$ are pitch circle radii, $\phi$ is the gear pair pressure angle, S is the distance from the pitch point to the contact point, wherein S is positive when the contact point lies on one side of a line of centers, and is a negative when the contact point lies on another side of the line of centers, and wherein $\rho_1$ and $\rho_2$ represent radii of curvature, wherein the radii of curvature are positive for convex profiles and negative for concave profiles,
wherein a relative curvature of said first tooth profile of said first gear and said second tooth profile of said mating gear is substantially a constant.

9. The gearing system of claim 8, wherein the axis of rotation of the first gear does not intersect the axis of rotation of the mating gear.

10. The gearing system of claim 8, wherein said first tooth profile is concave and said second tooth profile is convex.

11. The gearing system of claim 8, wherein a portion of said first tooth profile is concave and said second tooth profile is convex.

12. The gearing system of claim 8, wherein a portion of said first tooth profile is concave and a portion of said second tooth profile is convex.

13. The gearing system of claim 8, wherein the axis of rotation of the first gear is parallel to the axis of rotation of the mating gear.

14. The gearing system of claim 8, wherein the axis of rotation of the first gear is at an angle to the axis of rotation of the mating gear.

15. A gearing system comprising:
a first gear having a first plurality of teeth each having a first tooth profile lying entirely within the pitch circle of said first gear, said first tooth profile having a radius of curvature $\rho_1$; and
a mating gear having a second plurality of teeth each having a second tooth profile, conjugate to said first tooth profile through all transverse sections of the first and second profiles, and lying entirely outside the pitch circle of said mating gear, said second tooth profile having a radius of curvature $\rho_2$, said first gear and said mating gear having a gear pressure angle $\phi$,
wherein the function $$\frac{1}{\cos\phi}\left(\frac{1}{\rho_1} + \frac{1}{\rho_2}\right) = C$$

wherein C is a constant, said first and second tooth profiles having a common normal at a contact point which always passes through a pitch point of said first and second tooth profiles, said first and second tooth profiles further satisfying the equation:

$$\frac{1}{\rho_1 - S} + \frac{1}{\rho_2 + S} = \frac{1}{\sin\phi}\left(\frac{1}{R_{p1}} + \frac{1}{R_{p2}}\right)$$

wherein $R_{\rho 1}$ and $R_{\rho 2}$ are pitch circle radii, $\phi$ is the gear pair pressure angle, S is the distance from the pitch point to the contact point, wherein S is positive when the contact point lies on one side of a line of centers, and is a negative when the contact point lies on another side of the line of centers, and wherein $\rho_1$ and $\rho_2$ represent radii of curvature, wherein the radii of curvature are positive for convex profiles and negative for concave profiles.

16. The gearing system of claim 15, wherein the axis of rotation of the first gear does not intersect the axis of rotation of the mating gear.

17. The gearing system of claim 15, wherein the axis of rotation of the first gear is at an angle to the axis of rotation of the mating gear.

18. The gearing system of claim 15, wherein said first tooth profile is concave and said second tooth profile is convex.

19. The gearing system of claim 15, wherein a portion of said first tooth profile is concave and said second tooth profile is convex.

20. The gearing system of claim 15, wherein a portion of said first tooth profile is concave and a portion of said second tooth profile is convex.

21. The gearing system of claim 15, wherein the axis of rotation of the first gear is parallel to the axis of rotation of the mating gear.

22. A gearing system comprising:
first gear having a first plurality of teeth each having a first tooth profile lying entirely within the pitch circle of said first gear, said first tooth profile having a radius of curvature $\rho_1$; and
a mating gear having a second plurality of teeth each having a second tooth profile, conjugate to said first tooth profile through all transverse sections of the first and second profiles, and lying entirely outside the pitch circle of said mating gear, said second tooth profile having a radius of curvature $\rho_2$ said first gear and said mating gear having a gear pressure angle $\phi$, wherein the function $$\frac{1}{\cos\phi}\left(\frac{1}{\rho_1}+\frac{1}{\rho_2}\right)=C$$

wherein C is substantially a constant, said first and second tooth profiles having a common normal at a contact point which always passes through a pitch point of said first and second tooth profiles, said first and second tooth profiles further satisfying the equation:

$$\frac{1}{\rho_1-S}+\frac{1}{\rho_2+S}=\frac{1}{\sin\phi}\left(\frac{1}{R_{p1}}+\frac{1}{R_{p2}}\right)$$

wherein $R_{p1}$ and $R_{p2}$ are pitch circle radii. $\phi$ is the gear pair pressure angle, S is the distance from the pitch point to the contact point, wherein S is positive when the contact point lies on one side of a line of centers, and is a negative when the contact point lies on another side of the line of centers, and wherein $\rho_1$ and $\rho_2$ represent radii of curvature, wherein the radii of curvature are positive for convex profiles and negative for concave profiles.

23. The gearing system of claim 22, wherein the axis of rotation of the first gear does not intersect the axis of rotation of the mating gear.

24. The gearing system of claim 22, wherein the axis of rotation of the first gear is at an angle to the axis of rotation of the mating gear.

25. The gearing system of claim 22, wherein the axis of rotation of the first gear is parallel to the axis of rotation of the mating gear.

26. The gearing system of claim 22, wherein said first tooth profile is concave and said second tooth profile is convex.

27. The gearing system of claim 22, wherein a portion of said first tooth profile is concave and said second tooth profile is convex.

28. The gearing system of claim 22 wherein a portion of said first tooth profile is concave and a portion of said second tooth profile is convex.

* * * * *